(12) United States Patent
Koch

(10) Patent No.: US 6,634,972 B2
(45) Date of Patent: Oct. 21, 2003

(54) CHAIN TENSIONER

(75) Inventor: Reinhard Koch, Wachenroth (DE)

(73) Assignee: Ina Wälzlager Schaeffler oHG, Herzogenaurach (DE)

( * ) Notice: Subject to any disclaimer, the term of this patent is extended or adjusted under 35 U.S.C. 154(b) by 32 days.

(21) Appl. No.: 09/893,837

(22) Filed: Jun. 28, 2001

(65) Prior Publication Data

US 2002/0002090 A1 Jan. 3, 2002

(30) Foreign Application Priority Data

Jun. 29, 2000 (DE) .......................... 100 31 610

(51) Int. Cl.[7] .............................. F16H 7/08; F16H 7/22
(52) U.S. Cl. ......................................... 474/101; 474/109
(58) Field of Search ................................ 474/101, 110, 474/111, 109, 133, 138

(56) References Cited

U.S. PATENT DOCUMENTS

| 4,411,638 | A | * | 10/1983 | Wilson .................. 474/110 |
| 4,743,224 | A | * | 5/1988 | Yoshikawa et al. ......... 474/101 |
| 4,863,417 | A | * | 9/1989 | Kimata et al. ............ 474/101 |
| 4,902,266 | A | * | 2/1990 | Ojima et al. ............. 474/138 |
| 5,035,680 | A | * | 7/1991 | Ojima .................... 474/138 |
| 5,577,970 | A | * | 11/1996 | Smith et al. ............. 474/110 |
| 5,931,754 | A | * | 8/1999 | Stief et al. ............. 474/109 |
| 6,244,981 | B1 | * | 6/2001 | Simpson ................... 474/110 |
| 6,422,964 | B1 | * | 7/2002 | Rointru et al. ........... 474/138 |

FOREIGN PATENT DOCUMENTS

| DE | 36 27 373 A1 | 2/1988 |
| DE | 43 39 334 A1 | 6/1994 |
| DE | 196 50 289 A1 | 6/1997 |
| DE | 695 06 198 T2 | 4/1999 |
| EP | 0195 945 B1 | 8/1989 |

* cited by examiner

Primary Examiner—Marcus Charles
(74) Attorney, Agent, or Firm—Henry M. Feiereisen

(57) ABSTRACT

A chain tensioner, includes a housing intended for attachment to a stationary machine element of an internal combustion engine, and a piston received in the housing for axial displacement against a strand of a chain to thereby implement a tensioning of the chain. An adjusting mechanism is provided for moving the housing relative to the machine element in a direction to and away from the strand of the chain, whereby a spacer establishes a distance between the housing and the strand to thereby define an installation position of the housing.

11 Claims, 1 Drawing Sheet

CHAIN TENSIONER

CROSS-REFERENCES TO RELATED APPLICATIONS

This application claims the priority of German Patent Application Serial No. 100 31 610.7, filed Jun. 29, 2000, the subject matter of which is incorporated herein by reference.

BACKGROUND OF THE INVENTION

1. Field of the Invention

The present invention relates, in general, to a chain tensioner, and more particularly to a chain tensioner as used in chain drives of internal combustion engines.

2. Description of Prior Art

European Pat. No. 0 195 945 B1 describes a chain tensioner which includes a housing and a spring-biased piston received in the housing for axial displacement against a chain. Before installation of the chain tensioner, the piston is fixed in place within the housing by a transport safety mechanism. The housing is provided with boreholes for receiving screw fasteners to secure the housing to a stationary machine element. After attachment of the housing to the stationary machine element, the transport safety mechanism is removed, so that the piston can move under the action of the spring against the confronting strand of the chain.

The piston should have a sufficient operating stroke to keep the chain under tension. In addition, the operating stroke must be so sized as to reliably compensate for tolerances that are normally encountered in chain drive systems. In the event the distances of the center axes of the sprockets are smaller than the desired size, but still within the admissible tolerance range, the chain strand to be tensioned may undergo in the plane as covered by the chain greater deflections that have to be absorbed by the operating stroke of the chain tensioner. As a consequence of the greater operating stroke, the chain tensioner must be built of greater size, thereby increasing manufacturing costs and requiring a greater installation space. In view of the very compact structure of current internal combustion engines for motor vehicles and the available limited space for auxiliary aggregates, the chain tensioners according to European Pat. No. 0 195 945 B1 is unable to reconcile the contradicting demands, namely to ensure a sufficient operating stroke, on the one hand, and to provide a smallest possible chain tensioner.

It would therefore be desirable and advantageous to provide an improved chain tensioner to obviate prior art shortcomings.

SUMMARY OF THE INVENTION

According to one aspect of the present invention, a chain tensioner, includes a housing intended for attachment to a stationary machine element of an internal combustion engine, a piston received in the housing for axial displacement against a strand of a chain to thereby implement a tensioning of the chain; an adjusting mechanism for moving the housing relative to the machine element in a direction to and away from the strand of the chain; and a spacer for establishing a distance between the housing and the strand to thereby define a proper installation position of the housing.

Through the provision of a chain tensioner according to the present invention, the intended operating stroke of the piston can be dimensioned independently of tolerances of the chain drive. In situations, when the chain has great dimensions and thus covers a wide plane so that the chain strand being tensioned may be deflected to a substantial extent—because the smallest possible distance of the center axes of the sprockets is defined—the housing of the chain tensioner is moved in the direction of the chain strand being tensioned until the spacer abuts against the chain strand or against a tensioner bar that bears upon the chain strand. Optionally, the housing can then be moved even further until the chain strand reaches its maximum deflection. This defines the installation position of the housing, which can then be secured to the machine element. The spacer is hereby dimensioned for the type of chain drive being used.

Unlike in conventional chain tensioner, the piston of the chain tensioner according to the present invention is not intended to compensate for chain drive tolerances. As soon as the housing is displaced transversely to the chain strand and shifted at an oblique angle with respect to the chain strand, a displacement is effected in adjusting direction.

According to another feature of the present invention, the adjusting mechanism may be implemented in a simple manner by openings, in particular oblong holes, formed in the housing for receiving fasteners, such as screw fasteners, which are threadably engageable in the stationary machine element. As the housing of chain tensioners is typically mounted to the engine block or cylinder head by machine screws, and the housing has oblong holes at the adjusting directions, the adjusting mechanism can be realized without requiring additional parts.

The spacer may be supported by the housing and include a stop member for abutment against the chain strand or against a tensioner bar bearing against the chain strand. Attachment of the spacer and the stop member to the chain tensioner may be carried out already before installation of the chain tensioner depending on the intended chain drive. After securement of the housing of the chain tensioner, the spacer can be moved away from the tensioner bar or from the chain strand. The spacer may be articulated to the housing and simply be swung out, once the housing occupies the proper installation position. Of course, the spacer may also be so configured as to be completely removable after installation of the chain tensioner. It is also conceivable, to configure the spacer as a template for use by the installer during installation of the chain tensioner. After concluding the installation, the template may be removed again.

According to another feature of the present invention, the chain tensioner may also be combined with a detachable transport safety mechanism for holding the piston in transport position, i.e. locks the piston in place during transit or storage of the chain tensioner. Suitable, the spacer forms hereby part of the transport safety mechanism. For example, the transport safety mechanism may include a retainer arm which forms the spacer and embraces an end portion of the piston. The extension of the retainer arm between the piston and the chain strand or the tensioner bar bearing upon the chain strand is hereby so dimensioned that the installation position of the housing can be established in a manner as described above.

Installation and activation of a chain tensioner according to the present invention is simple. When the chain tensioner includes an internal locking mechanism for captivating the piston within the housing, the spacer may be designed as a component separated from the transport safety mechanism. In this case, the housing is shifted in adjusting direction toward the chain strand until the predetermined installation position has been implemented. Then, the housing is securely fixed to the machine element. Finally, the spacer is moved out of contact with the chain strand or the tensioner bar.

In the event, the chain tensioner is provided with a separate transport safety mechanism with integrated spacer, the housing is also securely fixed in the predetermined installation position. Subsequently, the transport safety mechanism is loosened and, optionally, removed, to move the spacer out of contact from the chain strand or tensioner bar. After loosening or removing the transport safety mechanism, the piston can move against the chain strand or tensioner bar.

BRIEF DESCRIPTION OF THE DRAWING

Other features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
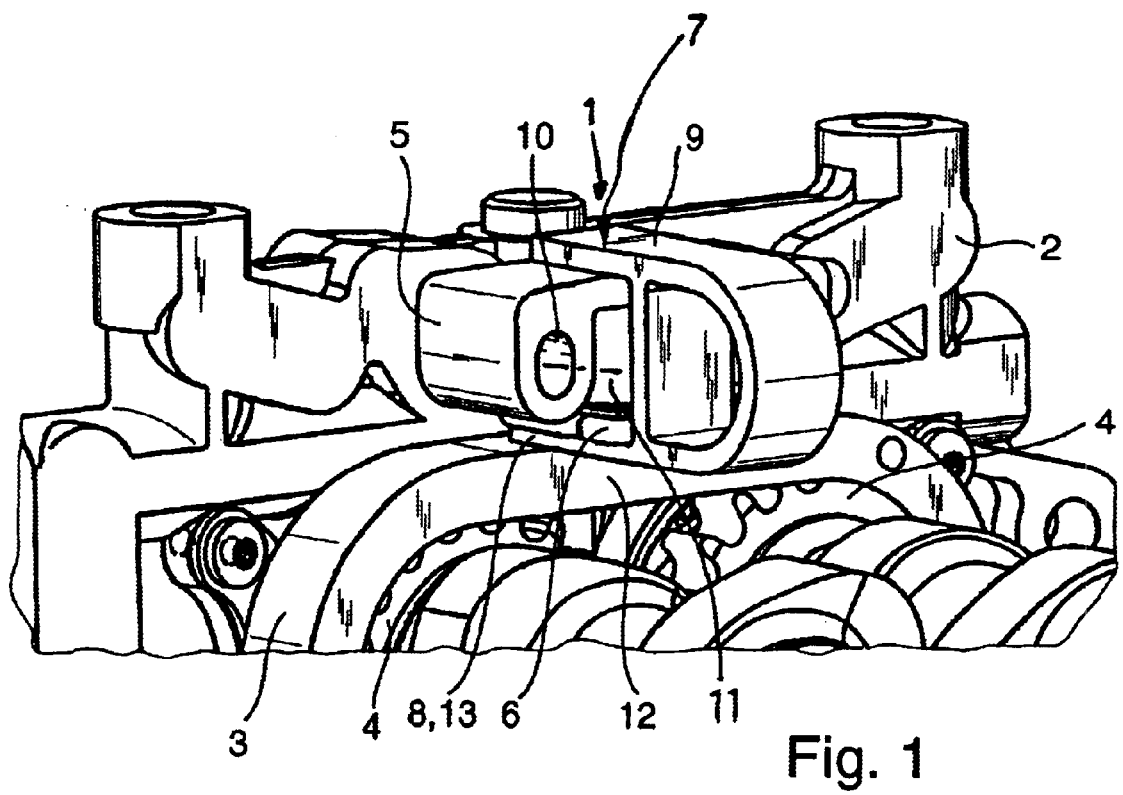
FIG. 1 is a cutaway view in perspective illustration of a chain drive having incorporated therein a chain tensioner according to the present invention.

Turning now to the drawing, and in particular to FIG. 1, there is shown a cutaway view in perspective illustration of a chain drive having incorporated therein a chain tensioner according to the present invention, generally designated by reference numeral 1 and attached to a cylinder head 2 (or engine block) of an internal combustion engine, for keeping a chain 3 of a chain drive in a tensioned state. The chain 3 of the chain drive is looped around respective sprockets 4, shown only partially. The chain tensioner 1 includes a housing 5 and a piston 6, which is received in the housing 5 for axial displacement in the direction of an upper strand 12 of the chain 3. For the sake of simplicity, the chain tensioner 1 will be described hereinafter only in connection with those parts that are necessary for the understanding of the present invention. Persons skilled in the art will understand that the chain tensioner 1 must contain much mechanical apparatus, e.g. sealing means or spring means, which does not appear in the foregoing Figures. However, as this apparatus, like much other necessary apparatus, is not part of the invention, it has been omitted from the Figures for the sake of simplicity.

The chain tensioner 1 includes a U-shaped transport safety mechanism 7 having a lower retainer arm 8, which embraces an end portion of the piston 6, and an upper support arm 9, which bears upon a piston-distal side of the housing 5. In describing the chain tensioner 1, the term "lower" will be used to denote a structure, which is located relatively closer to the chain 3, and the term "upper" will be used to denote a structure which is located relatively further to the chain 3.

The housing 5 is provided with oblong holes 10 (only one is shown in FIG. 1) for receiving screw fasteners, indicated in FIG. 1 by dash-dot line 11, which are threadably engageable in complementary threaded bores, not shown, of the cylinder head 2 to attach the housing 5. The oblong holes 10 are so disposed that the housing 5 can be moved in a direction toward and away from the chain strand 12 in respective adjustment positions. Thus, the oblong holes 10 of the housing 5 form together with the screw fasteners 11 an adjusting mechanism for suitably positioning and thus defining the installation position of the housing 5 with respect to the chain 3.

The retainer arm 8 of the transport safety mechanism 7 assumes the function of a spacer by which a distance of the housing 5 from the chain strand 12 is defined and thereby the installation position of the housing 5 is established. In the case at hand, the installation position of the housing 5 is determined by the thickness of the retainer arm 8, whereby the term "thickness" is defined hereby by the width of the retainer arm 8 between the chain strand 12 and the end face of the piston 6.

Installation and activation of the chain tensioner 1 according to the present invention is as follows: The housing 5 is initially loosely attached to the cylinder head 2 by the screw fasteners 11 which, however, are not yet fully tightened so as to allow a displacement of the housing 5 relative to the chain 3 into the desired adjustment position. The housing 5 is moved downwards in the direction of the chain strand 12 until the retainer arm 8 abuts against the chain strand 12. Optionally, after abutment of the retainer arm 8 against the chain strand 12, it may be desired, to further move the housing 5 in concert with the chain strand 12 downwards until maximum deflection of the chain strand 12 has been realized. At the stage, the installation position of the housing 5 is defined, and the screw fasteners 11 are fully tightened to securely fix the housing 5 in place to the cylinder head 2. Subsequently, the U-shaped transport safety mechanism 7 is detached from the chain tensioner 1, and the piston 6 can move against the chain strand 12, for example by means of a spring, not shown.

As chain drive tolerances can be compensated through displacement of the housing 5, the stroke of the piston 6 can be configured without regard to the chain drive tolerances.

Figure 2:
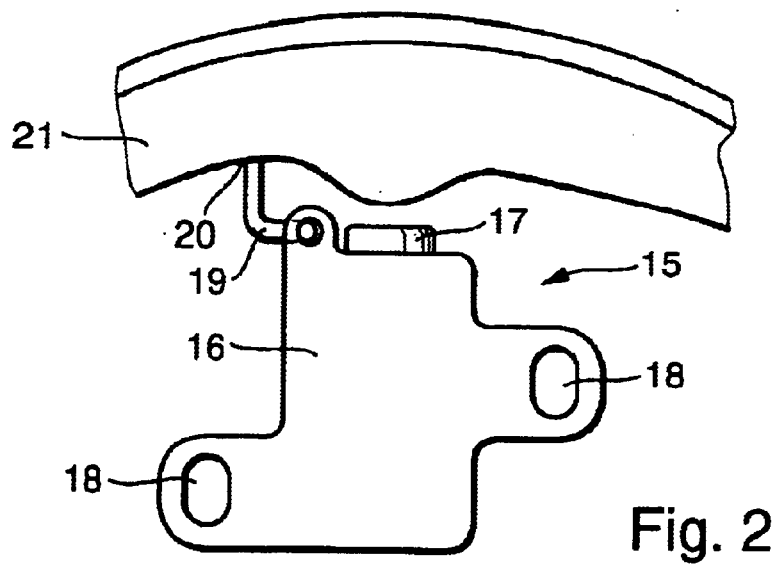
FIG. 2 is a schematic cutaway view of another embodiment of a chain tensioner according to the present invention.

Turning now to FIG. 2, there is shown a schematic cutaway view of another embodiment of a chain tensioner according to the present invention, generally designated by reference numeral 15. The chain tensioner 15 includes a housing 16, which has oblong holes 18, and a piston 17, which is received in the housing 16 for axial displacement in the direction of the chain, not shown here. A spacer 19 of substantially L-shaped configuration is swingably mounted to one end of the housing 16 by hooking a hook-shaped end 19a in a complementary bore of the housing 16. The spacer 19 has a stop member 20 at an end distal to the hook 19a; for abutment against a tensioner bar 21 which in turn abuts against the, not shown, chain strand of the chain and has one end pivotally mounted to the housing 16. Although not shown in detail, the chain tensioner 15 is provided with an internal locking mechanism by which the piston 17 is fixed in place in the transport position.

Installation and activation of the chain tensioner 15 according to the present invention is as follows: The housing 16 is moved in adjusting direction toward the tensioner bar 21 until the stop member 20 of the spacer 19 abuts against the tensioner bar 21. Optionally, the housing 16 may be moved together with the tensioner bar 21 further in adjusting direction until the, not shown, chain strand is fully deflected. At this stage, the installation position of the housing 16 is defined, and the housing 16 can be securely fixed to the cylinder head or engine block, not shown, through fully tightening screw fasteners, not shown, which are received in the oblong holes 18. Subsequently, the spacer 19 is swung away to disengage the stop member 20 from the tensioner bar 21, and the locking mechanism for the piston 17 is released to allow the piston 17 to move against the tensioner bar 21.

Also, in the case of the chain tensioner 15, chain drive tolerances can be compensated through displacement of the housing 16, so that the stroke of the piston 17 can be configured without regard to the chain drive tolerances.

While the invention has been illustrated and described as embodied in a chain tensioner, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A chain tensioner, comprising:
    a housing intended for attachment to a stationary machine element of an internal combustion engine;
    a piston received in the housing for axial displacement against a strand of a chain to thereby implement a tensioning of the chain;
    an adjusting mechanism for moving the housing relative to the machine element in a direction to and away from the chain strand;
    a spacer for establishing a distance between the housing and the chain strand to thereby define an installation position of the housing; and
    a transport safety mechanism for maintaining the piston in a transport position, wherein the transport safety mechanism has a retainer arm which forms the spacer and embraces an end portion of the piston.

2. The chain tensioner of claim 1, wherein the adjusting mechanism includes an opening, and a fastening means received with clearance in the opening and insertable into the machine element.

3. The chain tensioner of claim 2, wherein the fastening means includes a screw fastener.

4. The chain tensioner of claim 2, wherein the opening is an oblong hole.

5. The chain tensioner of claim 1, wherein the transport safety mechanism is a detachable transport safety mechanism.

6. The chain tensioner of claim 1, wherein the spacer forms part of the transport safety mechanism.

7. The chain tensioner of claim 1, wherein the machine element is one of a cylinder head and engine block.

8. A chain tensioner, comprising:
    a housing intended for attachment to a stationary machine element of an internal combustion engine;
    a piston movably received in the housing for tensioning a power transmission member of a drive;
    an adjusting mechanism for moving the housing in a direction to and away from the power transmission member;
    position-control means for establishing a predetermined distance between the piston and the power transmission member to thereby define an operating stroke of the piston; and
    a transport safety mechanism for maintaining the piston in a transport position, wherein the transport safety mechanism has a retainer arm which forms a spacer and embraces an end portion of the piston.

9. The chain tensioner of claim 8, wherein the adjusting mechanism includes an opening, and a fastening means received with clearance in the opening and insertable into the machine element.

10. The chain tensioner of claim 9, wherein the fastening means includes a screw fastener.

11. The chain tensioner of claim 9, wherein the opening is an oblong hole.

* * * * *